(12) United States Patent
Theander

(10) Patent No.: US 11,454,984 B2
(45) Date of Patent: *Sep. 27, 2022

(54) CONTROL OF REMOTE DEMOLITION ROBOT

(71) Applicant: HUSQVARNA AB, Huskvarna (SE)

(72) Inventor: Fredrik Theander, Stenkullen (SE)

(73) Assignee: HUSQVARNA AB, Huskvarna (SE)

( * ) Notice: Subject to any disclaimer, the term of this patent is extended or adjusted under 35 U.S.C. 154(b) by 252 days.

This patent is subject to a terminal disclaimer.

(21) Appl. No.: 16/845,926

(22) Filed: Apr. 10, 2020

(65) Prior Publication Data

US 2020/0241556 A1 Jul. 30, 2020

Related U.S. Application Data

(63) Continuation of application No. 15/768,980, filed as application No. PCT/SE2016/051004 on Oct. 17, 2016, now Pat. No. 10,656,658.

(30) Foreign Application Priority Data

Oct. 19, 2015 (SE) .................... 1551350-0

(51) Int. Cl.
*G05D 1/02* (2020.01)
*E02F 9/20* (2006.01)
(Continued)

(52) U.S. Cl.
CPC .......... *G05D 1/0276* (2013.01); *E02F 9/085* (2013.01); *E02F 9/2004* (2013.01); *E02F 9/205* (2013.01);
(Continued)

(58) Field of Classification Search
CPC .......... G05D 1/0276; G05D 2201/0202; E02F 9/085; E02F 9/2004; E02F 9/205;
(Continued)

(56) References Cited

U.S. PATENT DOCUMENTS 5,182,908 A * 2/1993 Devier ................. G05B 19/042
91/518
6,033,309 A 3/2000 Couch et al.
(Continued)

FOREIGN PATENT DOCUMENTS

CN 103909524 A * 7/2014
EP 1887148 A2 * 2/2008 ............ E02F 9/2004
(Continued)

OTHER PUBLICATIONS

Mark et al., "Hand and Finger Registration for Multi-Touch Joysticks on Software-Based Operator Control Units," 2011, Publisher: IEEE.*
(Continued)

*Primary Examiner* — Tuan C To
(74) *Attorney, Agent, or Firm* — Burr & Forman LLP

(57) ABSTRACT

A remote demolition robot (10) comprising a controller (17), drive means (14), an arm member (11) movably arranged on a tower (10*a*) rotatably arranged on a body (11*b*) of the remote demolition robot (10) and a remote control (22) for providing commands, that are interpreted by the controller (17) causing the controller (17) to control the operation of the remote demolition robot (10), wherein the remote control (22) comprises a first joystick (24*a*) and a second joystick (24*b*), wherein the remote control (22) is characterized in that each joystick (24) is provided with a thumb control switch (26).

20 Claims, 4 Drawing Sheets

(51) Int. Cl.
  *E02F 9/08* (2006.01)
  *G08C 17/02* (2006.01)
  *G05G 1/01* (2008.04)
  *G05G 9/047* (2006.01)
  *B25D 9/12* (2006.01)
  *B25D 17/08* (2006.01)

(52) U.S. Cl.
  CPC ............ *E02F 9/2012* (2013.01); *G05G 1/01* (2013.01); *G05G 9/047* (2013.01); *G08C 17/02* (2013.01); *B25D 9/12* (2013.01); *B25D 17/08* (2013.01); *B25D 2250/125* (2013.01); *B25D 2250/255* (2013.01); *G05D 2201/0202* (2013.01); *G05G 2009/04774* (2013.01); *G08C 2201/20* (2013.01); *G08C 2201/30* (2013.01)

(58) Field of Classification Search
  CPC ..... E02F 9/2012; G05G 9/0047; G08C 17/02; G08C 2201/30
  USPC .................................................................. 701/2
  See application file for complete search history.

(56) References Cited

U.S. PATENT DOCUMENTS

| | | | |
|---|---|---|---|
| 6,154,690 A | 11/2000 | Coleman | |
| 6,836,982 B1* | 1/2005 | Augustine | E02F 9/205 |
| | | | 701/50 |
| 8,380,402 B2 | 2/2013 | Hobenshield | |
| 8,870,655 B2 | 10/2014 | Ikeda | |
| 8,897,917 B2 | 11/2014 | Tanaka et al. | |
| 9,031,697 B2 | 5/2015 | Huang et al. | |
| 9,522,595 B2 | 12/2016 | Rudakevych et al. | |
| 9,669,249 B2 | 6/2017 | Marti et al. | |
| 2004/0136821 A1* | 7/2004 | Berger | E02F 3/433 |
| | | | 414/699 |
| 2004/0236467 A1 | 11/2004 | Sano | |
| 2005/0071048 A1 | 3/2005 | Watanabe et al. | |
| 2005/0277470 A1 | 12/2005 | Watanachote | |
| 2008/0027590 A1 | 1/2008 | Phillips et al. | |
| 2008/0086241 A1 | 4/2008 | Phillips et al. | |
| 2008/0179115 A1 | 7/2008 | Ohm et al. | |
| 2008/0266254 A1* | 10/2008 | Robbins | G05D 1/0044 |
| | | | 345/161 |
| 2011/0048162 A1 | 3/2011 | Miura et al. | |
| 2011/0282519 A1* | 11/2011 | Carlsson | E02F 9/205 |
| | | | 701/2 |
| 2012/0185091 A1 | 7/2012 | Field et al. | |
| 2013/0090764 A1 | 4/2013 | Summer et al. | |
| 2013/0219877 A1* | 8/2013 | Hughes | E02F 9/264 |
| | | | 73/1.72 |
| 2013/0264139 A1 | 10/2013 | Braun | |
| 2014/0110183 A1 | 4/2014 | Rudakevych et al. | |
| 2014/0156139 A1* | 6/2014 | Marquette | E02F 9/268 |
| | | | 701/36 |
| 2014/0166362 A1* | 6/2014 | Farmer | E21B 7/025 |
| | | | 60/420 |
| 2014/0172246 A1* | 6/2014 | Farmer | E21B 7/025 |
| | | | 701/50 |
| 2014/0214239 A1 | 7/2014 | Bruck et al. | |
| 2015/0002391 A1 | 1/2015 | Chen | |
| 2015/0190925 A1 | 7/2015 | Hoffman et al. | |
| 2016/0052137 A1* | 2/2016 | Hyde | G05D 1/0242 |
| | | | 701/28 |
| 2016/0304180 A1 | 10/2016 | Steven | |
| 2017/0092446 A1 | 3/2017 | Schmitz | |

FOREIGN PATENT DOCUMENTS

| | | | | |
|---|---|---|---|---|
| GB | 2308876 A | * | 7/1997 | ............ E02F 9/2004 |
| JP | 2014226094 A | * | 12/2014 | |
| KR | 100933912 B1 | | 12/2009 | |
| WO | 0036250 A1 | | 6/2000 | |
| WO | 02090668 A1 | | 11/2002 | |

OTHER PUBLICATIONS

Yujin et al., "Evaluation of Single Switch Interface with Robot Arm to Help Disabled People Daily Life," 2009, Publisher: IEEE.*
Achala et al., "Remote Control of Robot Arms via Network by Force-Free Control Followed Template Matching," 2011, Publisher: IEEE.*
Skulavik et al., "Fuzzy Control of Robotic Arm Implemented in PLC," 2013, Publisher: IEEE.*
Brokk Manual; Art. No. Manual 9511, "Manual Brokk 260 B3 911xxx English", last obtained Sep. 17, 2018.
Utlatande av Herr Hans Persson, TradOrdsgatan 8, 93131 SKELLEFTEA Forsaljningschef hos Brokk AB. Till 02 har aven bilagor A, B och C, , Mar. 23, 2018.
International Search Report and Written Opinion for International Application No. PCT/SE2016/051004 dated Jan. 10, 2017.
Final Notice and International-Type Search Report for Swedish Application No. 1750590-0 dated Jan. 30, 2018.
International Preliminary Report on Patentability for International Application No. PCT/SE2016/051004 dated Apr. 24, 2018.

* cited by examiner

CONTROL OF REMOTE DEMOLITION ROBOT

TECHNICAL FIELD

This application relates to the control of remote demolition robots, and in particular to simultaneous control of driving means and robot members.

BACKGROUND

Contemporary remote demolition robots are often put to work in difficult terrain. By the very nature of a demolition robot, the environment will certainly become more difficult to navigate once the demolition work has begun (unless, of course, it is a clearing operation). As such, the demolition robot may end up in some terrain that is very difficult to maneuver in, or the demolition robot may even get stuck.

A contemporary demolition robot has a great deal of control possibilities, such as controlling tools, arms, tower, caterpillars and outriggers. All these different controls are assigned to a few control switches and for example two joysticks. To enable a user to operate all possibilities, the possible actions are divided into different modes, where the control switches control different movements depending on which mode the demolition robot is operating in. This enables the operator to control all the demolition robot's functions using only two joysticks. However, to switch between two modes takes some time and also prevents some movements to be performed simultaneously, wherein one movement is controlled in one mode and another movement is controlled in another mode causing the demolition robot to operate in a jerky or irregular manner.

There is thus a need for a remote demolition robot that is able to operate more smoothly.

SUMMARY

On object of the present teachings herein is to solve, mitigate or at least reduce the drawbacks of the background art, which is achieved by the appended claims.

A first aspect of the teachings herein provides a remote demolition robot comprising a controller, drive means, an arm member movably arranged on a tower rotatably arranged on a body of the remote demolition robot and a remote control for providing commands, that are interpreted by the controller causing the controller to control the operation of the remote demolition robot, wherein the remote control comprises a first joystick and a second joystick, wherein the remote control is characterized in that each joystick is provided with a thumb control switch. The controller is configured to operate the remote demolition robot in a mode where the tower, the drive means, the arm member(s) and any tool being carried by the arm member are operable simultaneously, wherein the tower and possibly some movements of the arm member(s) are associated with the first joystick, the drive means are associated with the thumb control switch of each joystick, and the arm member(s) and any tool being carried by the arm member are associated with the second joystick, and preferably at least one joystick is provided with at least one top control switch, and wherein the outriggers are associated with the top control switch of the first joystick.

A second aspect provides a method for operating a remote control arranged to control a remote demolition robot comprising a controller, drive means, an arm member movably arranged on a tower rotatably arranged on a body of the remote demolition robot, wherein the remote control is arranged to provide commands, that are interpreted by the controller causing the controller to control the operation of the remote demolition robot, wherein the remote control comprises a first joystick and a second joystick, wherein each joystick is provided with a thumb control switch, wherein the method comprises: providing propulsion commands through said thumb control switches; providing tower rotation commands through said first joystick; and providing arm movement commands through said second joystick, wherein the propulsion commands, the tower rotation commands and said arm movement commands are provided simultaneously while operating in a same operating mode.

Other features and advantages of the disclosed embodiments will appear from the following detailed disclosure, from the attached dependent claims as well as from the drawings.

BRIEF DESCRIPTION OF DRAWING

The invention will be described below with reference to the accompanying figures wherein.

DETAILED DESCRIPTION

Figure 1:
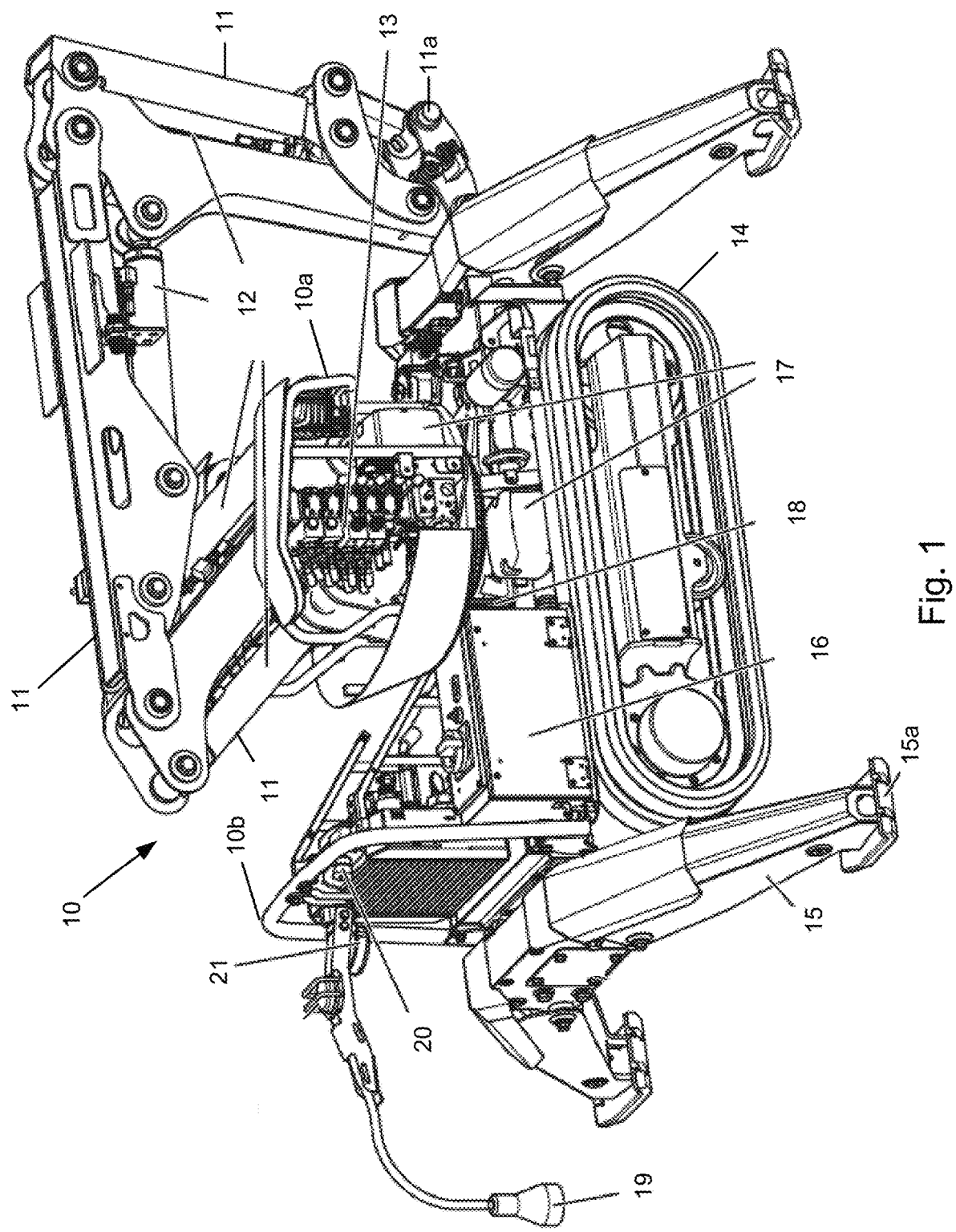
FIG. 1 shows a remote demolition robot according to an embodiment of the teachings herein.

FIG. 1 shows a remote demolition robot 10, hereafter simply referred to as the robot 10. The robot 10 comprises one or more robot members, such as arms 11, the arms 11 possibly constituting one (or more) robot arm member(s). One member may be an accessory tool holder 11a for holding an accessory 11b (not shown in FIG. 1, see FIG. 3). The accessory 11b may be a tool such as a hydraulic breaker or hammer, a cutter, a saw, a digging bucket to mention a few examples. The accessory may also be a payload to be carried by the robot 10. The arms 11 are movably operable through at least one cylinder 12 for each arm 11. The cylinders are preferably hydraulic and controlled through a hydraulic valve block 13 housed in the robot 10.

The robot 10 comprises caterpillar tracks 14 that enable the robot 10 to move. The robot may alternatively or additionally have wheels for enabling it to move, both wheels and caterpillar tracks being examples of drive means. The robot further comprises outriggers 15 that may be extended individually (or collectively) to stabilize the robot 10. At least one of the outriggers 15 may have a foot 15a (possibly flexibly arranged on the corresponding outrigger 15) for providing more stable support in various environments. The robot 10 is driven by a drive system 16 operably connected to the caterpillar tracks 14 and the hydraulic valve block 13. The drive system may comprise an electrical motor in case of an electrically powered robot 10 powered by a battery and/or an electrical cable 19 connected to an electrical grid (not shown), or a cabinet for a fuel tank and an engine in case of a combustion powered robot 10.

The body of the robot 10 may comprise a tower 10*a* on which the arms 11 are arranged, and a base 10*b* on which the caterpillar tracks 14 are arranged. The tower 10*a* is arranged to be rotatable with regards to the base 10*b* which enables an operator to turn the arms 11 in a direction other than the direction of the caterpillar tracks 14.

The operation of the robot 10 is controlled by one or more controllers 17, comprising at least one processor or other programmable logic and possibly a memory module for storing instructions that when executed by the processor controls a function of the demolition robot 10. The one or more controllers 17 will hereafter be referred to as one and the same controller 17 making no differentiation of which processor is executing which operation. It should be noted that the execution of a task may be divided between the controllers wherein the controllers will exchange data and/or commands to execute the task.

The demolition robot may be a remote controlled demolition robot. The robot 10 may further comprise a radio module 18. The radio module 18 may be used for communicating with a remote control (see FIG. 2, reference 22) for receiving commands to be executed by the controller 17 The radio module 18 may be used for communicating with a remote server (not shown) for providing status information and/or receiving information and/or commands. The controller may thus be arranged to receive instructions through the radio module 18. The radio module may be configured to operate according to a low energy radio frequency communication standard such as ZigBee®, Bluetooth® or WiFi®. Alternatively or additionally, the radio module 18 may be configured to operate according to a cellular communication standard, such as GSM (Global System Mobile) or LTE (Long Term Evolution).

The robot 10, in case of an electrically powered robot 10) comprises a power cable 19 for receiving power to run the robot 10 or to charge the robots batteries or both. For wired control of the robot 10, the remote control 22 may alternatively be connected through or along with the power cable 19. The robot may also comprise a Human-Machine Interface (HMI), which may comprise control buttons, such as a stop button 20, and light indicators, such as a warning light 21.

Figure 2A:
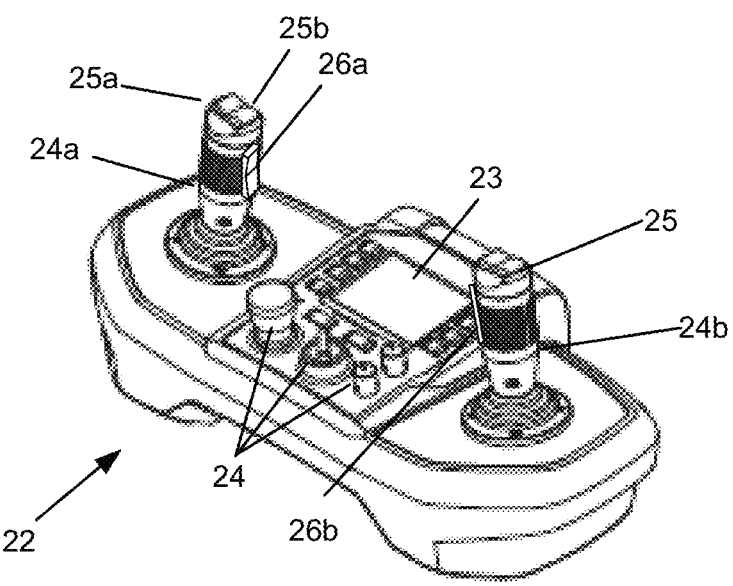
FIG. 2A shows a remote control 22 for a remote demolition robot according to an embodiment of the teachings herein.

FIG. 2A shows a remote control 22 for a remote controlled demolition robot such as the robot 10 in FIG. 1. The remote control 22 may be assigned an identity code so that a robot 10 may identify the remote control and only accept commands from a correctly identified remote control 22. This enables for more than one robot 10 to be working in the same general area. The remote control 22 has one or more displays 23 for providing information to an operator, and one or more controls 24 for receiving commands from the operator. The controls 24 include one or more joysticks, a left joystick 24*a* and a right joystick 24*b* for example as shown in FIG. 2A, being examples of a first joystick 24*a* and a second joystick 24*b*. It should be noted that the labeling of a left and a right joystick is merely a labeling used to differentiate between the two joysticks 24*a*, 24*b*. A joystick 24*a*, 24*b* may further be arranged with a top control switch 25. In the example of FIG. 2A, each joystick 24*a*, 24*b* is arranged with two top control switches 25*a*, 25*b*. The joysticks 24*a*, 24*b* and the top control switches 25 are used to provide maneuvering commands to the robot 10. The control switches 24 may be used to select one out of several operating modes, wherein an operating mode determines which control input corresponds to which action. For example: in a Transport mode, the left joystick 24*a* may control the caterpillar tracks 14 and the right joystick 24*b* may control the tower 10*a* (which can come in handy when turning in narrow passages); whereas in a Work mode, the left joystick 24*a* controls the tower 10*a*, the tool 11*b* and some movements of the arms 11, and the right joystick 24*b* controls other movements of the arms 11; and in a Setup mode, the each joystick 24*a*, 24*b* controls each a caterpillar track 14, and also controls the outrigger(s) 15 on a corresponding side of the robot 10. It should be noted that other associations of functions to joysticks and controls are also possible.

The remote control 22 may be seen as a part of the robot 10 in that it is the control panel of the robot 10. This is especially apparent when the remote control is connected to the robot through a wire. However, the remote control 22 may be sold separately to the robot 10 or as an additional accessory or spare part.

The remote control 22 is thus configured to provide control information, such as commands, to the robot 10 which information is interpreted by the controller 17, causing the robot 10 to operate according to the actuations of the remote control 22.

Figure 3:
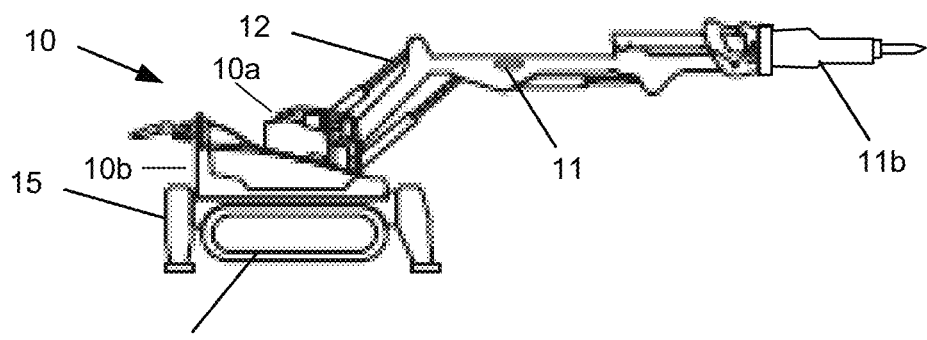
FIG. 3 shows a schematic view of a robot according to an embodiment of the teachings herein.

FIG. 3 shows a schematic view of a robot 10 according to FIG. 1. In FIG. 3, the caterpillar tracks 14, the outriggers 15, the arms 11 and the hydraulic cylinders 12 are shown. A tool 11*b*, in the form of a hammer 11*b*, is also shown (being shaded to indicate that it is optional).

The inventors have realized that in certain situations, such as in very difficult terrain, the modes of the prior art does not provide sufficient control of the robot in order to react to different movements, such as reactional movements (such as starting to slide), when navigating a difficult terrain. For example, the operator may need to use the arms 11 for changing the balance of the robot 10 or maybe for supporting or maybe even pushing the robot 10, but to switch modes may not prove to be fast enough for the operator to manage to steer the robot through the terrain avoiding getting stuck, or to get free when the robot 10 has gotten stuck. Furthermore, the inventors have realized that the movement controls allowed in any of the existing modes does not provide sufficient control for these difficult terrains. The inventors also realized that there is simply not enough controls available on a contemporary remote control 22.

The inventors have therefore devised a clever and insightful arrangement of controls on the remote control for enabling full control of a remote controlled demolition robot. To not require full relearning of the previous modes, and to simplify the understanding of the robot's control, the inventors have also provided a new operational mode.

The remote control 22 has been provided with a thumb control switch 26 on each of the joysticks 24. Each thumb control switch is associated with and arranged to control each a caterpillar track (or the wheels) on a corresponding side of the robot 10. The thumb control switch 26*a* on the left joystick 24*a* controlling the caterpillar tack 14 on the left side, and the thumb control switch 26*b* on the right joystick 24*b* controlling the caterpillar tack 14 on the right side.

The thumb control switch 26 is arranged on a side of the joystick 24, preferably on the handle of the joystick 24. This enables the operator to control the thumb switch 26 with his thumb, the top control switch 25 with his index finger (or alternatively operating the thumb-switch with one or more fingers and the top switch with the thumb) and the joystick 24 with his hand and remaining fingers. The operator is thus provided with additional control options for controlling the robot 10, whereby the additional control options may be performed simultaneously.

The thumb control switch 26 is a two-way switch, wherein each direction of the two-way switch corresponds to a direction for the caterpillar tracks 14. For example, up corresponds to forwards, and down corresponds to backwards.

The thumb control switch 26 is furthermore an analogue or proportional control switch, wherein a speed of the caterpillar tracks 14 is associated with an angle or degree that the thumb control switch is depressed. An operator can thus control the robot to advance (or turn) at low speeds by pressing lightly on the thumb control switches 26, and to advance (or turn) at high speeds by pressing hard on the thumb control switches 26.

Figure 4:
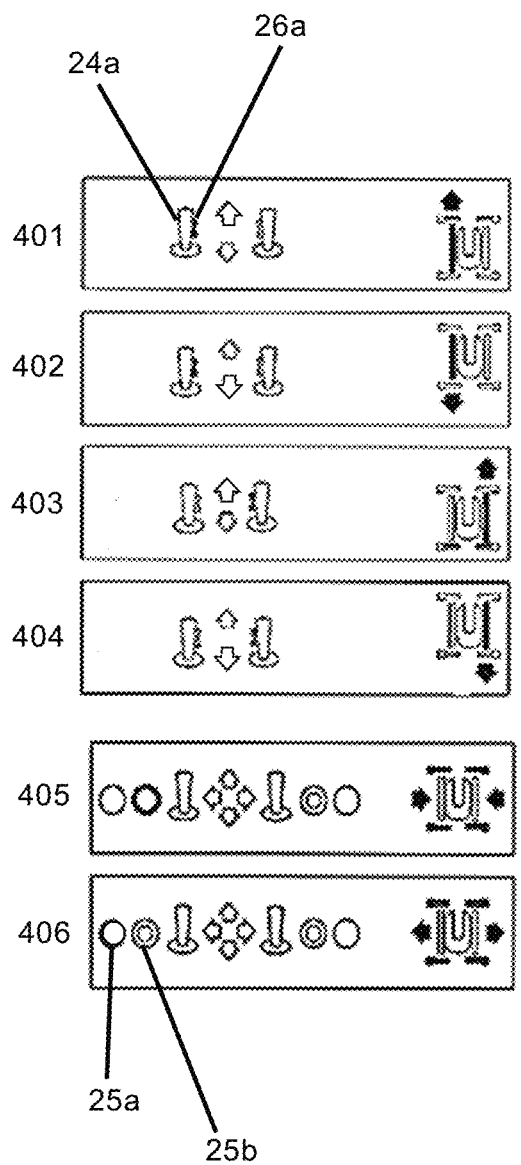
FIG. 4 shows a table of controls being activated and the corresponding control actions being executed by a remote demolition robot according to an embodiment of the teachings herein.
Figure 4:
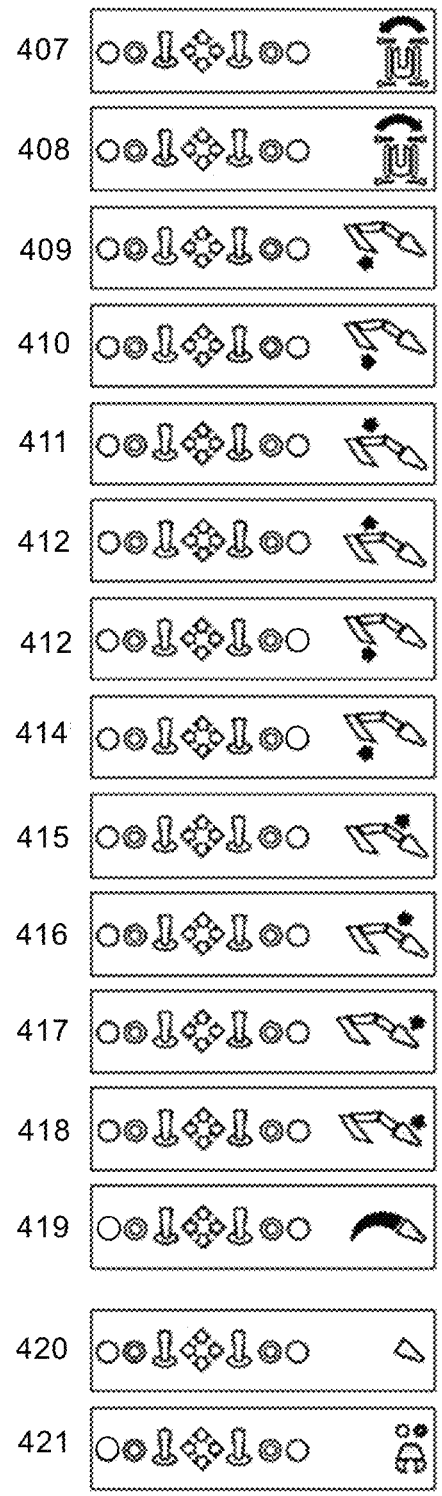

FIG. 4 shows a table of controls being activated and the corresponding control actions being executed by the robot 10. The scheme shows which actuation results in which action. The actuations are shown as a control being darkened, and for multiple way switches, the arrows indicate in which way the control is actuated.

As can be seen in FIG. 4, actuation of the thumb control switches 26, such as an upwards actuation of the left thumb control switch 26a arranged on the left joystick 24a results in the left caterpillar track 14 being driven forward 401. The speed at which the caterpillar track is driven is proportionate to the degree or angle that the thumb control switch 26a is depressed. Another example is that an actuation of the right top switch control 25b on the left joystick 24a results in the outriggers being withdrawn 405, and an actuation of the left top switch control 25a on the left joystick 24a results in the outriggers being deployed 406.

The figure shows which action is taken for which actuation.

The actuation of the controls referenced 401 is associated with the function of driving the left caterpillar track forward.

The actuation of the controls referenced 402 is associated with the function of driving the left caterpillar track in reverse.

The actuation of the controls referenced 403 is associated with the function of driving the right caterpillar track forward.

The actuation of the controls referenced 404 is associated with the function of driving the right caterpillar track in reverse.

The actuation of the controls 405 is associated with the function of withdrawing the outriggers.

The actuation of the controls referenced 406 is associated with the function of deploying the outriggers. The actuation of the controls referenced 407 is associated with the function of rotating the tower counter-clockwise.

The actuation of the controls referenced 408 is associated with the function of rotating the tower in a clockwise direction.

The actuation of the controls referenced 409 is associated with the function of moving the arm 11a inwards.

The actuation of the controls referenced 410 is associated with the function of moving the arm 11a outwards.

The actuation of the controls referenced 411 is associated with the function of moving the arm 11a down.

The actuation of the controls referenced 412 is associated with the function of moving the arm 11a up.

The actuation of the controls referenced 413 is associated with the function of moving the arm 11a and the arm 11b outwards.

The actuation of the controls referenced 414 is associated the function of moving the arm 11a and the arm 11b inwards.

The actuation of the controls referenced 415 is associated with the function of moving the a third arm upwards.

The actuation of the controls referenced 416 is associated with the function of moving the third arm downwards.

The actuation of the controls referenced 417 and 418 are associated with the function of respectively adjusting the angle inwards and outwards.

The actuation of the controls referenced 419 is associated with the function of adjusting the pressure and/or the flow to the hydraulic tool.

The actuation of the controls referenced 420 is associated with the function of adjusting the pressure and/or the flow to a maximum provided to the hydraulic tool.

The actuation of the controls referenced 421 is associated with the function of opening or closing the cutters.

As can be seen, this allows an operator to control the robot in a smooth manner without interruptions as many controls can be actuated simultaneously. For example, the operator can control the caterpillar tracks 14 with his thumbs, while controlling the tower with his left hand (left joystick 24a) and the arm(s) 11 with his right hand (right joystick). Optionally, some functions of the arm(s) 11 may also be controlled by the left joystick in combination with actuation of a top switch 25 (or other switch). Naturally, the alternative operating modes of a joystick depending on actuation of a switch or not may be interchanged with one another without departing from the scope of this invention. The arm 11 can thus be moved to any position to balance the robot 10 while the caterpillar tracks are controlled accurately and proportionally. This constellation of actions and controls is highly beneficial in that it allows an operator to maneuver the body of robot 10 with his left hand and the arm with the right hand. The arm generally requires more dexterity which is the case or most operator's right hand. Naturally, the constellation may be reversed for a left-handed operator.

The arm can also or alternatively be moved to any position and be used to push or to pull (especially if the tool is a bucket) the robot 10 in a desired direction while the caterpillar tracks are controlled accurately and proportionally.

At the same time, the operator can deploy (or withdraw) the outriggers 15 to stabilize or support the robot 10 in a certain position. The outriggers 15 may also be used to provide an additional lift or push to the robot 10. All this while the operator controls the arm 11, the tower 10a and the caterpillar tracks 14 in a smooth and proportional manner.

The operator is thus enabled to simultaneously move caterpillar tracks 14, outriggers 15, tower 10a and arm 11 in one coordinated and smooth movement, wherein the different components are individually controlled to react to any dynamic behaviour.

The inventors have realized that through an intelligent selection of functions to be associated with the controls, it is possible to gain a better control of the robot without the need of constantly changing operational modes. The precise combination of simultaneously controlling the tower, the arm carrying the tool, the caterpillar tracks and the outriggers and the manner in which these functions are allocated to the various switches forms a precise and distinct selection which has been inventively selected. This provides for a greatly improved maneuvering of the demolition robot which may be crucial in certain instances as has been described herein. For example, should the demolition robot start sliding down a hole or ditch, the controller is now able to simultaneously turn the tower and move the arms to position the tool for supporting or pushing the demolition robot, while extending the outriggers to stabilize the demolition robot and at the same time provide propulsion through the caterpillars. In this manner the controller will be able to prevent the demolition robot from sliding down into a ditch. In prior art system the user would have to stress through performing one action at the time and to change modes in between, while also having to remember which mode to select to and in what order to effectively perform the maneuver.

It should be noted that in some modes, the top switches may be used to operate or control a tool 11b instead of the outriggers. Alternatively, the top switches may be used to control both the outriggers and a tool through a different functional allocation of the top switch actuations.

The speed of reaction and smoothness of operation is vital in a fail/succeed situation, such as freeing the robot when it is stuck (fail=remain stuck, succeed=get free) and poses higher requirements on reaction time and smoothness, than normal operation, such as when cutting in a specific pattern, where the operation may be paused, while the robot is moved to a different position or pose.

The realization that a thumb control 26 can beneficially be used and the introduction of this in a position (on the side of the joystick) so that the operator can reach the thumb control switches simultaneously with the top control switches 25 while manipulating the joystick 24 have thus provided a solution to the above stated problems.

Furthermore, the inventors have realized that the simultaneous control of the thumb control switches 26 and the joysticks 24 are keys to a smooth and versatile operation, even without top switches.

Figure 2B:
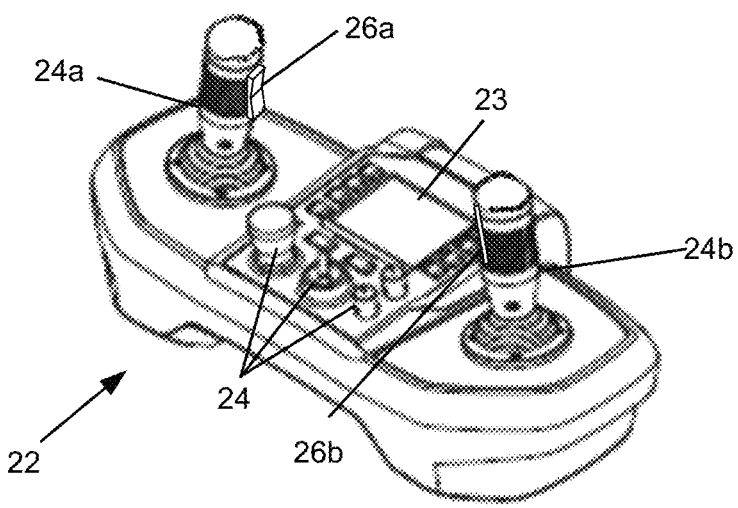
FIG. 2B shows an alternative remote control 22 for a remote demolition robot according to an embodiment of the teachings herein.

FIG. 2B shows an alternative remote control 22 for a remote controlled demolition robot such as the robot 10 in FIG. 1. As in FIG. 2A, the remote control 22 may be assigned an identity code so that a robot 10 may identify the remote control and only accept commands from a correctly identified remote control 22.

As in FIG. 2A the remote control 22 has one or more displays 23, and one or more controls 24 for receiving commands from the operator. The controls 24 include one or more joysticks, a left joystick 24a and a right joystick 24b for example as shown in FIG. 2B, being examples of a first joystick 24a and a second joystick 24b. The joysticks 24a, 24b are used to provide maneuvering commands to the robot 10.

As in FIG. 2A, the control switches 24 may be used to select one out of several operating modes, wherein an operating mode determines which control input corresponds to which action.

As for the remote control 22 of FIG. 2A, the remote control 22 may be seen as a part of the robot 10 in that it is the control panel of the robot 10.

The remote control 22 of FIG. 2B has also been provided with a thumb control switch 26 on each of the joysticks 24. Each thumb control switch 26 is associated with and arranged to control each a caterpillar track (or the wheels) on a corresponding side of the robot 10. The thumb control switch 26a on the left joystick 24a controlling the caterpillar tack 14 on the left side, and the thumb control switch 26b on the right joystick 24b controlling the caterpillar tack 14 on the right side.

The thumb control switch 26 is arranged on a side of the joystick 24, preferably on the handle of the joystick 24. This enables the operator to control the thumb switch 26 with his thumb and the joystick 24 with his hand and remaining fingers. The operator is thus provided with additional control options for controlling the propulsion of the robot 10, the rotation of the tower 10a and the movement of the arm(s) 11, whereby the additional control options may be performed simultaneously.

As for the remote control 22 of FIG. 2A, the thumb control switch 26 may be a two-way switch, wherein each direction of the two-way switch corresponds to a direction for the caterpillar tracks 14.

As for the remote control 22 of FIG. 2A, the thumb control switch 26 may furthermore be an analogue or proportional control switch, wherein a speed of the caterpillar tracks 14 is associated with an angle or degree that the thumb control switch is depressed.

Utilizing a remote control 22 according to FIG. 2B thus enables an operator to control the robot 10 smoothly and to react to and deal with events and obstacles occurring in a difficult terrain.

Figure 5:
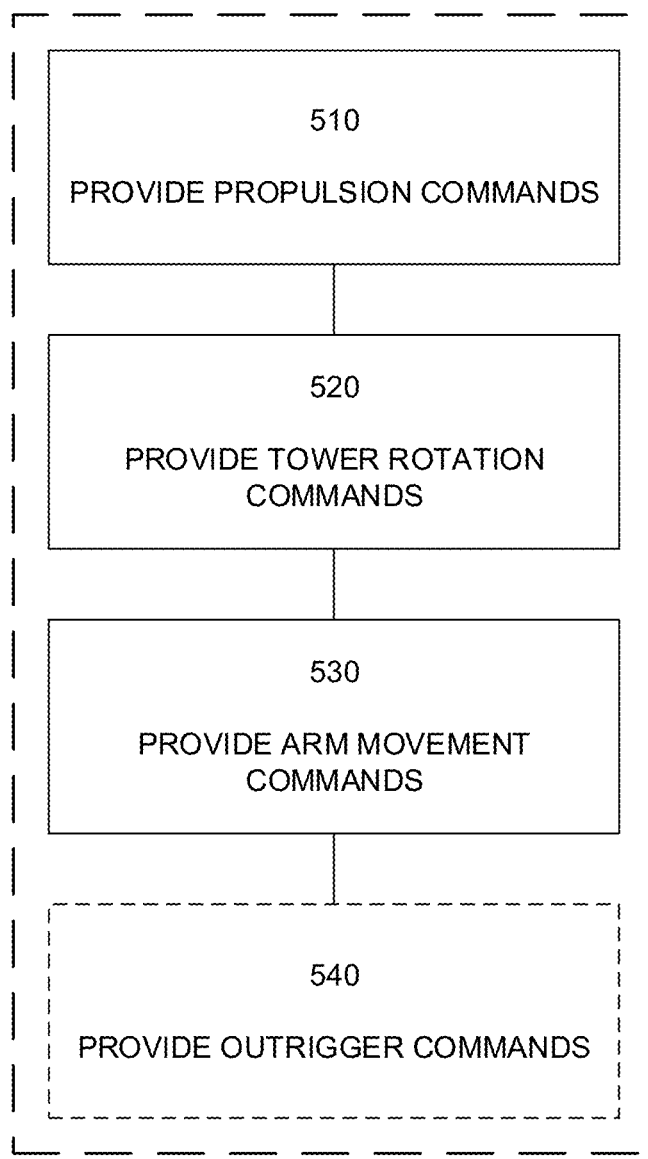
FIG. 5 shows a flowchart for a general method according to an embodiment of the teachings herein.

FIG. 5 shows a flowchart for a general method according to herein. The robot 10 is controlled by the operator providing 510 propulsion commands through the thumb control switches 26a, 26b. The propulsion commands are commands that control the drive means 14 of the robot. The robot 10 is also provided 520 with tower rotation commands through the first (left) joystick 24a which instruct the robot 10 in how to turn or rotate the tower 10a. And, the operator also provides 530 arm movement commands through the second (right) joystick 24b, which commands control the movement of the arms 11 and possibly also a tool 11b attached to or carried by the arms 11. It should be noted that the propulsion commands, the tower rotation commands and the arm movement commands are provided simultaneously while operating in a same operating mode, as is indicated by the dashed box in FIG. 5. In one embodiment the operator may also provide 540 outrigger commands for controlling the outriggers 15 of the robot 10. The outrigger commands are also provided simultaneously with the other commands.

The invention has mainly been described above with reference to a few embodiments. However, as is readily appreciated by a person skilled in the art, other embodiments than the ones disclosed above are equally possible within the scope of the invention, as defined by the appended patent claims.

That which is claimed:

1. A remote-controlled demolition robot comprising:
   a controller configured to control operation of the remote demolition robot;
   a drive means;
   outriggers;
   a tower rotatably arranged on a body of the remote demolition robot;
   an arm member movably arranged on the tower, and
   a remote control for providing commands to the remote demolition robot, the commands being interpreted by the controller to cause the controller to control the operation of the remote demolition robot,
   wherein the remote control comprises a first joystick and a second joystick, each of the first joystick and the second joystick comprising a thumb control switch,
   wherein either of the first joystick or the second joystick further comprises a top switch,
   wherein the first joystick is configured to operate the tower,
   wherein the thumb control switch of each of the first joystick and the second joystick is configured to operate the drive means,
   wherein each of the first joystick and the second joystick are each configured to operate the arm member, wherein the top switch is configured to operate a tool being carried by the arm member and the outriggers, wherein the controller is configured to operate the remote demolition robot in a first mode where the drive means, the tower, and the arm member are operable simultaneously, wherein the controller is configured to operate the remote demolition robot in a second mode where the drive means and the tool are operable simultaneously, and wherein the controller is configured to operate the remote demolition robot in a third mode where the drive means and the outriggers are operable simultaneously.

2. The remote-controlled demolition robot of claim 1, wherein the thumb control switch of each the first joystick and the second joystick is arranged laterally on a side of the respective first joystick and the second joystick.

3. The remote-controlled demolition robot of claim 2, wherein the top switch is arranged on a top surface of either the first joystick or the second joystick.

4. The remote-controlled demolition robot of claim 1, wherein the thumb control switch of each of the first joystick and the second joystick is a proportional switch arranged to provide information on how far the thumb control switch is pressed.

5. The remote-controlled demolition robot of claim 1, wherein the thumb control switch of each of the first joystick and the second joystick is a two-way switch arranged to provide information in response to the thumb control switch being pressed.

6. The remote-controlled demolition robot according to claim 1, wherein the drive means comprises caterpillar tracks.

7. A remote-controlled demolition robot comprising:
a controller configured to control operation of the remote demolition robot;
a drive means;
a tower rotatably arranged on a body of the remote demolition robot;
an arm member movably arranged on the tower; and
a remote control for providing commands to the remote demolition robot, the commands being interpreted by the controller to cause the controller to control the operation of the remote demolition robot,
wherein the remote control comprises a first joystick and a second joystick, each of the first joystick and the second joystick comprising a thumb control switch,
wherein the first joystick is configured to operate the tower,
wherein the first joystick and the second joystick are each configured to operate the arm member,
wherein the thumb control switch of each of the first joystick and the second joystick is configured to operate the drive means, and
wherein the controller is configured to operate the remote demolition robot in a mode where the tower, the drive means, and the arm member are operable simultaneously.

8. The remote-controlled demolition robot of claim 7, wherein the thumb control switch of each of the first joystick and the second joystick is arranged laterally on a side of the respective first joystick and the second joystick.

9. The remote-controlled demolition robot of claim 7, wherein the thumb control switch of each of the first joystick and the second joystick is a proportional switch arranged to provide information on how far the thumb control switch is pressed.

10. The remote-controlled demolition robot of claim 7, wherein the thumb control switch of each of the first joystick and the second joystick is a two-way switch arranged to provide information in response to the thumb control switch being pressed.

11. The remote-controlled demolition robot according to claim 7, wherein the drive means comprises caterpillar tracks.

12. A remote-controlled demolition robot comprising:
a controller configured to control operation of the remote demolition robot;
a drive means;
a tower rotatably arranged on a body of the remote demolition robot;
an arm member movably arranged on the tower; and
a remote control for providing commands to the remote demolition robot, the commands being interpreted by the controller to cause the controller to control the operation of the remote demolition robot,
wherein the remote control comprises a first joystick and a second joystick, each of the first joystick and the second joystick comprising a thumb control switch,
wherein either of the first joystick or the second joystick further comprises a top switch,
wherein the thumb control switch of each of the first joystick and the second joystick is configured to operate the drive means,
wherein the top switch is configured to operate a tool being carried by the arm member, and
wherein the controller is configured to operate the remote demolition robot in a mode where the drive means and the tool are operable simultaneously.

13. The remote-controlled demolition robot of claim 12, wherein the thumb control switch of each of the first joystick and the second joystick is arranged laterally on a side of the respective first joystick and the second joystick.

14. The remote-controlled demolition robot of claim 13, wherein the top switch is arranged on a top surface of either the first joystick or the second joystick.

15. The remote-controlled demolition robot of claim 12, wherein the thumb control switch of each of the first joystick and the second joystick is a proportional switch arranged to provide information on how far the thumb control switch is pressed.

16. The remote-controlled demolition robot of claim 12, wherein the thumb control switch of each of the first joystick and the second joystick is a two-way switch arranged to provide information in response to the thumb control switch being pressed.

17. The remote-controlled demolition robot according to claim 12, wherein the drive means comprises caterpillar tracks.

18. A remote-controlled demolition robot comprising:
a controller configured to control operation of the remote demolition robot;
a drive means;
outriggers;
a tower rotatably arranged on a body of the remote demolition robot;
an arm member movably arranged on the tower; and
a remote control for providing commands to the remote demolition robot, the commands being interpreted by the controller to cause the controller to control the operation of the remote demolition robot,
wherein the remote control comprises a first joystick and a second joystick, each of the first joystick and the second joystick comprising a thumb control switch, wherein either of the first joystick or the second joystick further comprises a top switch, wherein the thumb control switch of each of the first joystick and the second joystick is configured to operate the drive means, wherein the top switch is configured to operate the outriggers, and wherein the controller is configured to operate the remote demolition robot in a mode where the drive means and the outriggers are operable simultaneously.

19. The remote-controlled demolition robot of claim 18, wherein the thumb control switch of each of the first joystick and the second joystick is arranged laterally on a side of the respective first joystick and the second joystick.

20. The remote-controlled demolition robot of claim 19, wherein the top switch is arranged on a top surface of either the first joystick or the second joystick.

* * * * *